United States Patent [19]

Bustany

[11] 4,387,698
[45] Jun. 14, 1983

[54] SLURRY SAW BLADE HEAD ASSEMBLY

[75] Inventor: Samir T. Bustany, Morris Township, Morris County, N.J.

[73] Assignee: Allied Corporation, Morris Township, N.J.

[21] Appl. No.: 245,774

[22] Filed: Mar. 20, 1981

Related U.S. Application Data

[63] Continuation of Ser. No. 67,571, Aug. 17, 1979, abandoned.

[51] Int. Cl.³ .............................................. B28D 1/06
[52] U.S. Cl. .................................... 125/18; 51/283 R
[58] Field of Search ....................... 125/16 R, 17, 18; 30/346.54; 51/283 R

[56] References Cited

U.S. PATENT DOCUMENTS

| 3,168,087 | 2/1965 | Anderson | 125/16 R |
| 3,556,075 | 1/1971 | Arwine | 125/16 R |
| 3,871,836 | 3/1975 | Polk | 30/346.54 |
| 4,287,869 | 9/1981 | Schmid | 125/16 R |

Primary Examiner—James G. Smith
Attorney, Agent, or Firm—Gerhard H. Fuchs; Ernest D. Buff

[57] ABSTRACT

A blade head assembly for a slurry saw comprises a plurality of elongated, thin (0.02 to 0.14 millimeter thick) blades in spaced parallel relationship made of a metallic glass which is at least 50 percent amorphous and is based on one or more of nickel, iron, cobalt, chromium and vanadium.

13 Claims, 2 Drawing Figures

SLURRY SAW BLADE HEAD ASSEMBLY

This is a continuation, of application Ser. No. 67,571, filed Aug. 17, 1979, now abandoned.

BACKGROUND OF THE INVENTION

Slurry saws are well known devices for cutting hard bodies of crystalline materials such as quartz, silicon, germanium, semiconductor or gem stone materials and the like, into thin slices or wafers. The blades generally are softer than the material being cut, and cutting is effected by abrasive particles introduced in the form of a slurry into the interface between the blade and the material to be cut. Slurry saws and blade assemblies therefor and their operation are, for example, described in U.S. Pat. Nos. 3,272,195; 3,556,075; 3,845,541; 3,889,699; 4,092,971; 4,092,972 and 4,105,012. For use in slurry saws, it is desirable to use the thinnest blade possible because the thickness of the cut, which is determined by the thickness of the blade, and the abrasive between the blade and the material being cut, represents waste. On the other hand, to insure blade rigidity in the cutting operation, the slurry saw blades must be highly tensed. Tension required to insure rigidity generally increases with decreasing blade thickness so that, as a practical limitation, conventionally used slurry saw blades made of steel have thickness in the order of typically at least about 0.2 millimeter. Additionally, high hardness is a desirable characteristic of steel for use in slurry saw blades in order to reduce blade wear. Slurry saw blades, of course, are not sharpened since they do not rely for cutting action on a sharpened edge.

It is an object of the present invention to provide slurry saw blade head assemblies which afford savings in production cost, particularly through reduced yield losses.

SUMMARY OF THE INVENTION

There is provided a blade head assembly for a slurry saw comprising a plurality of elongated thin blades in spaced parallel relationship characterized in that the blades have a thickness of from about 0.02 to 0.14 millimeter, which are of a metallic glass which is at least 50 percent amorphous. Suitable metallic glasses include those having the composition $X_a Y_b Z_c$ wherein X is one or more of Ni, Fe, Co, Cr and V;
Y is one or more of Mo, Mn, Ti, W, Hf, Nb, Ta and Cu;
Z is one or more of P, B, C, Si, Al, Sb, Sn, In, Ge and Be;
a ranges from about 45 to 90 atomic percent;
b ranges from 0 to about 25 atomic percent; and
c ranges from about 10 to 35 atomic percent, the sum of a+b+c being 100.

Desirably, these blades have a DPH hardness value (diamond pyramid hardness) of at least about 800 kg/mm$^2$ and an ultimate tensile strength of at least about 300,000 psi (2.1 GPa). The above-described alloys may additionally contain incidental impurities.

Use of the above-described slurry saw head assembly, as compared to use of head assemblies of identical construction but employing conventional steel blades of conventional thickness, drastically cuts waste of the material being cut since the waste is proportional to the blade thickness, and thinner blades are provided by the present invention. Additionally, thinner blades permit installation of a greater number of blades in an assembly so that for a given head assembly, more cuts can be taken in the same amount of time, which directly translates into a proportional increase in labor and machine productivity.

BRIEF DESCRIPTION OF THE DRAWING

The drawings schematically illustrate a slurry saw head assembly, in plan view (FIG. 1) and elevation (FIG. 2).

DETAILED DESCRIPTION OF THE INVENTION AND OF THE PREFERRED EMBODIMENTS

The strip of metallic glass for making the blades for the slurry saw blade head assembly of the present invention may be made by any of the known melt-spin procedures for making amorphous metal strip. For example, a suitable procedure involves cooling a melt of the desired composition at a rate of at least about $10^{4\circ}$ C./sec., more usually of at least about $10^{5\circ}$ C./sec., by depositing the molten alloy onto a rapidly moving chill substrate as, for example, described in U.S. Pats. 3,856,513 and 4,142,571.

I have found that the above-described metallic glasses are exceptionally well suited for use as slurry saw blades since compositions with high as-formed hardness, ductility, high elastic limit, good corrosion resistance and exceptionally high tensile strength can be selected. Their greater tensile strength and hardness, as compared to those of steel commonly employed in slurry saw blades, permits use of thinner blades which can be highly tensed to form a rigid blade head assembly, resulting in the above-described economies of reduced waste and improved operating efficiency. Their greater hardness and better abrasion resistance, as compared to those of presently used steel blades, results in reduced wear and improved operating life.

The blades can be cut from strip of suitable width as obtained in the melt-spin operation, especially as obtained by the "Planar Flow Casting" procedure disclosed in U.S. Pat. 4,142,571 to Narasimhan, which permits direct casting from the melt of metallic glass strip of any desired width. The strip may be cast directly to desired width, or the blades may be obtained by lengthwise slitting of wider strip. Since cutting operation of the slurry saw blades does not depend on a sharp cutting edge, provision of such edge is neither necessary nor desired.

Figure 1:
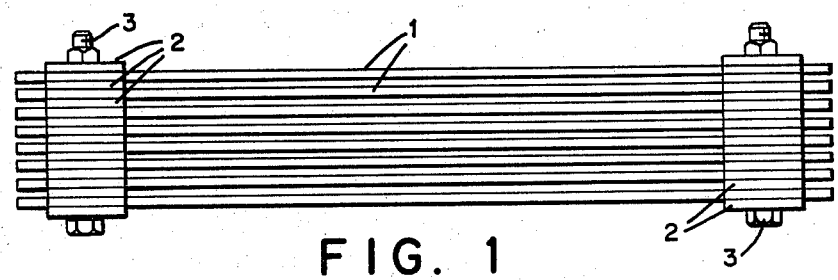
Figure 2:
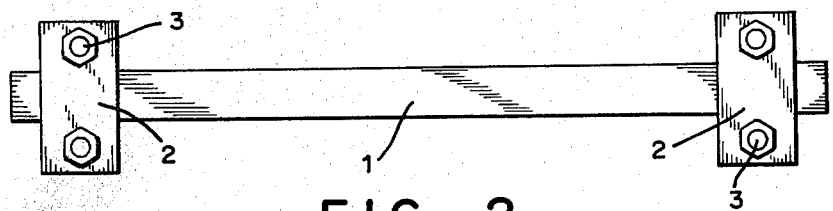

In the drawings, plan view FIG. 1 and elevation FIG. 2 illustrate a multi-blade package comprising an assembly of a plurality of elongated blades 1 of metallic glass of the above-described and dimensions, separated at both ends by a series of flat spacers 2. At both ends, the assembly is held together by means of bolts 3 passing through spacers 2. In operation, the whole package is held under longitudinal tension by means not shown. The particular construction, other than the choice of the particular blades, is not a specific feature of the present invention and any type of construction for slurry saw head assemblies may be employed.

Strips of many different alloy compositions can be used as slurry saw blades in accordance with my invention. The preferred alloys would consist primarily of iron, nickel, cobalt, chromium, vanadium and mixtures thereof. Alloys of particular interest contemplated by the invention are those having the general formula $M_r T_s$ wherein M may be any combination of Ni, Fe, Co, Cr or V; T may be any combination of P, B, C, Si and Al; and r and s represent atomic percent, r generally ranging from about 90 to 65 atomic percent and s generally ranging from about 10 to 35 atomic percent. Preferably, r will vary from about 84 to 73 atomic percent, while s will vary from about 16 to about 27 atomic percent.

Examples of some of the preferred compositions include $Ni_{75}P_{16}B_6Al_3$; $Ni_{50}Fe_{28}P_{14}B_6Al_2$; $Cr_{24}Fe_{24}Ni_{30}P_{14}B_4C_2SI_2$; $Fe_{38}Cr_{38}P_{15}C_4B_2Al_3$; $Fe_{40}Ni_{40}P_{14}B_6$; $Fe_{30}Co_{20}Cr_{28}P_{14}B_6Al_2$; $Fe_5Ni_{44.5}B_{16.2}Mo_4Cr_{10.1}Co_{20.2}$; $Fe_{77.5}B_{20}Mo_{2.5}$; $Fe_{82}B_{12}Si_6Fe_{80}B_{10}Si_{10}$; $Fe_{78}P_{16.5}Si_{5.5}$, $Fe_{81}B_{12}C_2Si_5$, and $Fe_{40}Ni_{38}Mo_4B_{18}$.

Alloys of that type and composition are also described in U.S. Reissue Pat. No. 29,989 to Polk and Morris for "Cutting Blades Made of or Coated with Amorphous Metal."

Inclusion of alloying elements such as Mo, Mn, Ti, W, Hf, Nb, and Ta will generally result in improved hardness and increased tensile strength and elongation. Accordingly, it is contemplated that in the above formula up to about ⅓ of M may be substituted by one or more of Mo, Mn, Ti, W, Hf, Nb and Ta.

The best mode presently contemplated involves a slurry saw head assembly as above described utilizing a plurality of blades being substantially completely amorphous by X-ray diffraction, and having the composition $Ni_{68}Cr_7F_3B_{14}Si_8$ or $Ni_{45}Co_{20}Cr_{10}Fe_5Mo_4B_{16}$. These blades have a width of about 6.5 millimeter (about ¼ inch) and a thickness of about 0.1 millimeter (4 mil). These alloys are available from Allied Chemical Corporation under the designation "METGLAS Alloy 2805A" and "METGLAS Alloy 634", respectively. Preferably, the blades have thickness in the order of about 0.08 to about 0.1 millimeter.

I claim:

1. A blade head assembly for a slurry saw for slicing hard bodies of crystalline material comprising a plurality of elongated thin blades in spaced parallel relationship characterized in that the blades are non-sharpened, have a thickness of from about 0.02 to 0.14 mm, and are of a metal which is at least about 50 percent amorphous.

2. The blade head assembly of claim 1 wherein the blades are made of metal having the composition $X_aY_bZ_c$ wherein X is one or more of Ni, Fe, Co, Cr and V;

Y is one or more of Mo, Mn, Ti, W, Hf, Nb, Ta and Cu;

Z is one or more of P, B, C, Si, Al, Sb, Sn, In, Ge and Be;

a ranges from about 45 to 90 atomic percent;

b ranges from about 0 to 25 atomic percent; and c ranges from about 10 to 35 atomic percent, the sum of a+b+c being 100.

3. A blade head assembly according to claim 1 wherein the blades have a diamond pyramid hardness of at least about 800 kg/mm$^2$, and an ultimate tensile strength of at least about 300,000 psi.

4. A blade head assembly according to claim 1 wherein the blades have a thickness of from 0.05 to about 0.1 millimeter.

5. A blade head assembly according to claim 1 wherein the alloy has the composition $M_rT_s$ wherein M is one or more of Fe, Co, Ni, Cr or V;

T is one or more of P, B, C, Si and Al;

r ranges from about 90 to 65 atomic percent; and s ranges from about 10 to 35 atomic percent.

6. A blade head assembly according to claim 5 wherein up to about ⅓ of M is substituted by one or more of Mo, Mn, Ti, W, Hf, Nb and Ta.

7. A blade head assembly according to claim 1 wherein the blades have the composition $Fe_5Ni_{45}B_{16}Mo_4Cr_{10}Co_{20}$.

8. A blade head assembly according to claim 1 wherein the blades have the composition $Fe_{81}B_{12}C_2Si_5$.

9. A blade head assembly according to claim 1 wherein the blades have the composition $Fe_{40}Ni_{38}Mo_4B_{18}$.

10. The method of cutting a body of crystalline material which comprises contacting the material with a blade having a non-sharpened cutting edge of a metal which is at least about 50 percent amorphous, and interposing abrasive particles dispersed in a liquid medium between the material and the blade and advancing the blade.

11. The method of claim 10 wherein the crystalline material is quartz.

12. The method of claim 10 wherein the crystalline material is silicon.

13. The method of claim 10 wherein the crystalline material is germanium.

* * * * *